Figure 1:
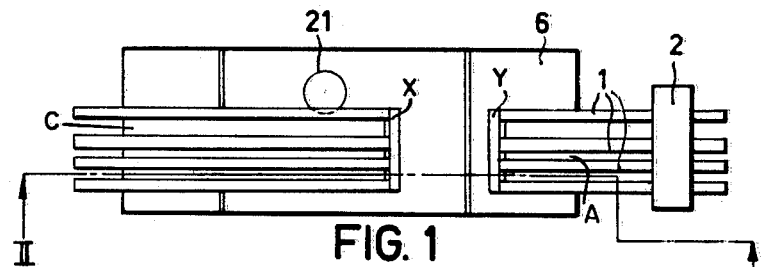

Feb. 18, 1964     C. L. JANSEN     3,121,563
ARTICLE FOR HOLDING A PLURALITY OF WIRES
Filed July 18, 1960     2 Sheets-Sheet 1

INVENTOR
Cornelis C. Jansen.
BY
AGENT

Feb. 18, 1964 C. L. JANSEN 3,121,563
ARTICLE FOR HOLDING A PLURALITY OF WIRES
Filed July 18, 1960 2 Sheets-Sheet 2

INVENTOR
Cornelis L. Jansen
BY Frank R. Trifari
AGENT

United States Patent Office 3,121,563
Patented Feb. 18, 1964

3,121,563
ARTICLE FOR HOLDING A PLURALITY OF WIRES
Cornelis Leendert Jansen, Mollenhutseweg, Nijmegen, Netherlands, assignor to North American Philips Company, Inc., New York, N.Y., a corporation of Delaware
Filed July 18, 1960, Ser. No. 43,604
Claims priority, application Netherlands Aug. 14, 1959
5 Claims. (Cl. 269—40)

This invention concerns improvements in or relating to holders for fixing in orientated and stressed positions two or more wires protruding at least on one side, from an object, for example, the current conductors of a transistor.

In order to fix, in a holder, two or more wires projecting, at least at one side, from an object, for instance the current conductors of a transistor, so that the wires and also the object are orientated in a given desired position with respect to the holder, use has been made of a holder having two relatively movable partitions, between which the wires can be inserted and subsequently clamped tight by approaching these partitions to each other. This kind of holder has, however, various disadvantages. One of them consists in that the wires projecting from the object and having to occupy a co-planar position are frequently damaged by clamping. A further disadvantage is that the manufacture of this holder is fairly costly, since it is composed of more than one part. Moreover, the insertion of the wires into the holder takes much time.

The invention has for its object to provide a holder which does not exhibit the aforesaid disadvantages and in which the method of holding the wires projecting from at least on one side of the holder in desired orientation is improved by application of different principles.

The holder according to the invention is provided with a plurality of recess defining locating areas so that, when the wires are inserted into the holder and adjacent the locating areas, they are elastically bent in the direction of length and held in a curved state. The term "elastic" is to be understood to mean that the wires are subjected to a bending stress lying within the range of elasticity of the wire material. When the wires are withdrawn from the holder, they will therefore reassume substantially their initial shape.

An important advantage of the holder according to the invention resides in that the locating areas can be provided in a holder consisting of one piece of material, so that the cost of manufacture of the holder is low. A further advantage consists in that, even when the wires are held stressed in the holder, they may be shifted in the longitudinal direction or in the direction of their length, in contradistinction to the aforesaid known holders in which the wires cannot be displaced without the need for further means, when they have once been clamped tight.

An important range of use of the holder according to the invention is found in the field of automation in which the objects to which the wires are connected or some of the wires, or both are to be subjected to a sequence of different processes. At the beginning of the sequence the wires are inserted into the holder, serving in this case as a transport holder, and withdrawn therefrom after the last process has been achieved.

In two important embodiments of the invention the wires, subsequent to insertion, are held elastically in a curved state by three locating areas, this number being a minimum for curving the wires. The difference between the two embodiments resides in the manner of inserting the wires into the holder and of producing the bending stress of the wires.

In the first embodiment the three locating areas are relatively orientated so that, after the wires have been slipped in an axial direction into the first two locating areas, the bending stress is produced by a further axial displacement of the wires by the third locating area.

In the second embodiment the three locating areas are formed so that, after the wires projecting on one side from the object have been inserted in an axial direction into an aperture provided between two locating areas, the bending stress is produced by turning the object in a direction transverse to the plane going through the wires and subsequently urging part of the wires into the third locating area, of which the upright side walls first converge towards the centre of the area and then diverge therefrom in a sharp bend. In a further development of these two kinds of holders provisions are made to hold the wires in the holder orientated and/or spaced apart from each other at a desired distance.

The invention will be described more fully with reference to examples of the two embodiments of the holder, shown in the drawing.

Figure 2:
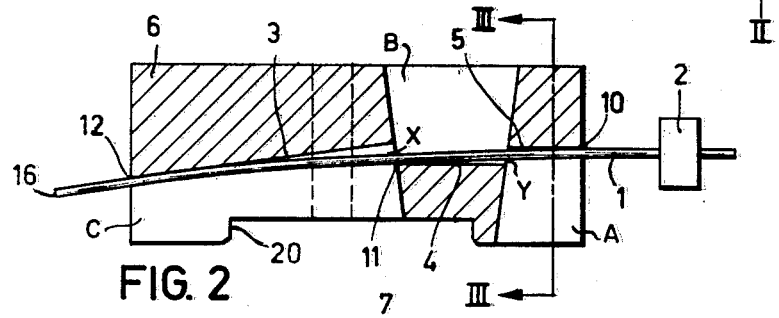
Figure 3:
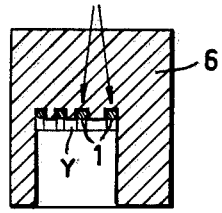
Figures 4, 5:
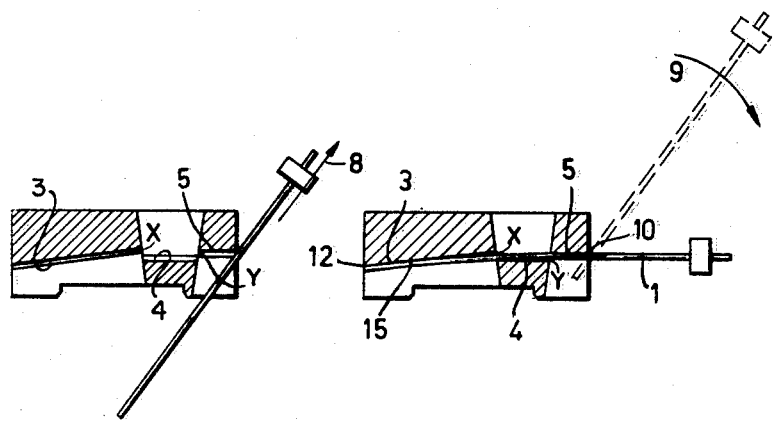

In the drawing FIGS. 1 to 5 relate to the first embodiment of the holder according to the invention. FIG. 1 is a bottom plan view, FIG. 2 is a cross-sectional view taken on the line II—II of FIG. 1 and FIG. 3 is a cross-sectional view taken on the line III—III of FIG. 2. FIGS. 4 and 5 show how the wires protruding from an object can be inserted into the holder.

Figure 6:
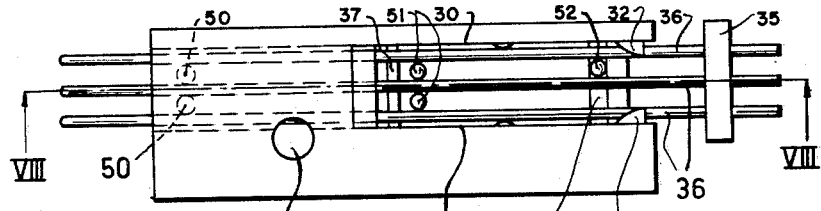
Figure 7:
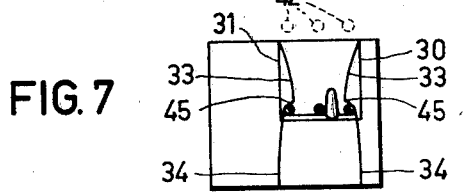
Figure 8:
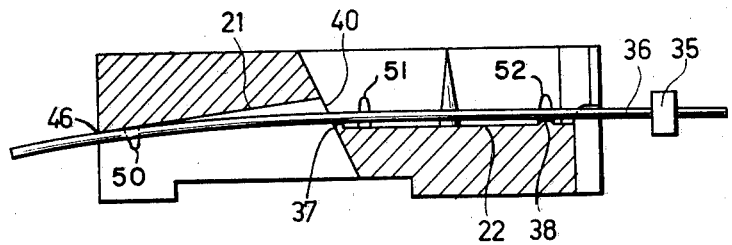
Figures 9, 10:
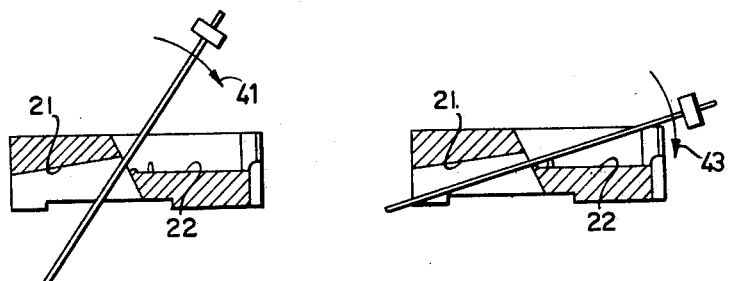

FIGS. 6 to 10 relate to the second embodiment of the holder according to the invention. FIGS. 6 and 7 are a plan view and a side view of the holder respectively and FIG. 8 is a sectional view taken on the line VIII—VIII of FIG. 6. FIGS. 9 and 10 illustrate how the wires protruding from from an object can be inserted into this holder.

In order to fix the oriented and stressed positions of the wires 1 projecting from an object 2 in the manner shown in FIG. 1, use may be made of a holder as shown in FIGS. 1, 2 and 3, which comprises a block 6, having a plurality of recesses A, B, C, defining locating areas 3, 4 and 5. Block 6 may be Plexiglas. The locating areas are formed in the block 6 during manufacture so that the locating areas can be made in a single process, for example, by pressing. The locating areas are each provided with a plurality of adjacent slots (7) (FIG. 3) of which the width corresponds at least approximately to the diameter or width of the wires 1 and of which the number corresponds at least to the number of wires projecting from the object 2. The adjacent locating areas are interconnected by transverse openings $x$ and $y$ through which the wires pass from one area to another.

The wires 1 are inserted over part of their length into the slots 7 so that with respect to the holder they occupy a position as is shown in FIG. 4. Then the wires are moved with respect to the holder in the direction of the arrow 8 along the end of the slots 7 operating as a comb until the object 2 with the wires occupies a position as is shown in FIG. 5 in broken lines. The wires are then turned about the point 10 in the direction of the arrow 9 and after they have attained a substantially horizontal position they are positioned, in a manner illustrated in FIG. 5 by full lines in the slots of the locating areas 4 and 5. By a suitable choice of the inclination of the locating area 3 with respect to the locating areas 4 and 5, the wires (engaging the locating area 3, after they have been displaced in an axial direction), will be bent under bending stress at three places or points defining a curved plane. The final position in which the wires are held oriented and stressed in the holder will be evident from FIG. 2. In this figure the said places or points defining the curved plane are designated by 10, 11 and 12. It will be obvious that with a suitable choice of the angle of inclination of the locating area 3 relative to the locating areas 4 and 5 the bending stress of the wires will just lie within the range of elasticity of these wires. It will also be evident that, after the wires have been inserted into the holder in the manner set forth, they can be displaced over a given part in the longitudinal direction of their length. The end 16 of the wires 1 can thus be finally located at a place between the points designated by 12 and 15 in FIG. 5. However, the wires may also protrude from the holder as is shown in FIG. 2.

The holder is furthermore provided with a recess 20, which corresponds to the profile of a conveyor belt, over which a plurality of successive holders can be transported. The holder is furthermore provided with a pierced hole 21 so that one of the wires inserted into the holder is exposed within the sectional area of this hole, as is evident from FIG. 1. Into this hole can be inserted a pin, which may fulfill two functions, i.e. on the one hand it may serve as a rotary or a transport shaft and on the other hand it may serve for conveying electrical current to one of the outer wires.

FIGS. 6, 7 and 8 show a further embodiment of the holder according to the invention.

This holder has two locating areas 21 and 22 located between side surfaces 30 and 31 and a third locating area formed by extensions 32 on the surfaces 30 and 31 (FIG. 6). In a side view (FIG. 7) these extensions have a profile which first converges and then diverges after a sharp bend (33 and 34). The locating areas 21 and 22 are furthermore provided with a few pin type extensions 50, 51 and 52 to hold the wires 36 protruding from an object 35 in the manner shown in FIG. 6 at a given distance from each other. In this holder the wires are held oriented and stressed in the manner shown with the holder of FIGS. 1, 2 and 3 at three places defining a curved plane. In oder to hold the wires in the holder in a bent state so that the wires engage the locating areas only at discrete points, the locating area 22 is provided with two ridges 37 and 38. Furthermore, as in the previous holder, this holder has a pierced hole 39.

The insertion of the wires 36, protruding from the object 35 into this holder is to be carried out in a manner slightly differing from that of the holder shown in FIGS. 1, 2 and 3. FIGS. 9 and 10 illustrate such insertion. The wires 36 of the object 35 are taken through the hole 40 lying between the locating areas 21 and 22; care is taken that the wires arrive between the extensions 51 as is best shown in FIG. 6. The wires are then turned with respect to the holder in the direction of the arrow 41 so that they occupy a position as shown in FIG. 10 with respect to the holder. The part of the wires adjacent the object 35 are located at a place designated by numeral 42 in FIG. 7. Then the wires are moved in the direction of the arrow 43 until they occupy a substantially horizontal position relative to the locating area 22. The parts of the two outer wires adjacent the object, when passing along the converging portion 33, will be bent slightly towards each other. After having passed along the converging portion the two outer wires are allowed to detend in the cavities 45 between the converging portions 33 and the diverging portions 34. The wires are thus held oriented and elastically bent in the holder as is shown in FIG. 7. The locating areas are then formed by the edge 46, the ridges 37 and 38 and the cavities 45. The third locating area is formed in this case by the ridge 38 and the cavity 45. It will be obvious that also with this holder the wires can be displaced in a longitudinal direction relative to the holder.

Important fields of use of the holders as described above are those in which wires protruding from an object, the object itself, or both are to be subjected to some process. The holder may then serve as a transport agent, in which the object with wires is inserted and in which the wires may be held until the various processes have been carried out. Since most parts of the wires inserted into the holder are accessible to liquids, the holder may be used successfully, when the wires are to be subjected to some dipping process.

What is claimed is:

1. An article for holding a plurality of wires comprising a block member having a plurality of alternately oppositely directed recesses terminating within the interior of said block member and in communication with one another for receiving said wires, and a plurality of locating areas within said block defined by the innermost surface of said block defining the associated recess, said innermost surfaces defining said locating areas for elastically deforming each said wire to hold them in said block member.

2. An article for holding a plurality of wires comprising a block member having a plurality of alternately oppositely directed recesses terminating within the interior of said block member and intersecting within the interior of said block member for receiving said wires, and a plurality of locating areas within said block member defined by the innermost surface of said block defining the associated recess, said innermost surfaces defining said locating areas for elastically deforming said wires to hold them in said block, and said recesses providing access to portions of the wires held within said block.

3. An article for holding a plurality of wires according to claim 2 wherein said block member has two intersecting recesses defining an opening in said block at said intersection for receiving said wires introduced into said block member, and with the addition of upright side walls in one end of said block member defining a slot opening into one of said recesses, said side walls converging inwardly toward the adjacent locating area to a point above the plane of the surface of said locating area and diverging sharply from said point to the said plane.

4. An article according to claim 2 wherein at least one of said locating areas includes a plurality of slot defining means for separating the wires to be held within said block.

5. An article according to claim 2 wherein said locating areas are so related that wires fully inserted into the block member engage the locating areas only at given points throughout said areas.

References Cited in the file of this patent

UNITED STATES PATENTS

| 1,289,380 | Brumfield | Dec. 31, 1918 |
| 2,226,440 | Parker | Dec. 24, 1940 |
| 2,759,251 | Huyett | Aug. 21, 1956 |

OTHER REFERENCES

German application 1,045,630, printed December 4, 1958, Kl. 37b 4/01.